(12) United States Patent
Huang et al.

(10) Patent No.: US 8,391,628 B2
(45) Date of Patent: Mar. 5, 2013

(54) DIRECTIONAL ANTI-ALIASING FILTER

(75) Inventors: Yong Huang, Singapore (SG); Lucas Hui, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 284 days.

(21) Appl. No.: 12/970,817

(22) Filed: Dec. 16, 2010

(65) Prior Publication Data
US 2012/0155783 A1 Jun. 21, 2012

(51) Int. Cl.
*G06K 9/40* (2006.01)
*H04N 1/407* (2006.01)
*G09G 5/00* (2006.01)

(52) U.S. Cl. .......... 382/260; 358/3.26; 345/611

(58) Field of Classification Search .......... 382/260, 382/264, 266, 274–275, 305, 312; 358/3.26, 358/3.27; 345/582, 611; 375/254
See application file for complete search history.

(56) References Cited

U.S. PATENT DOCUMENTS

| | | | | |
|---|---|---|---|---|
| 6,806,708 | B1* | 10/2004 | Lee et al. | 324/307 |
| 7,088,510 | B2* | 8/2006 | McGettigan et al. | 359/489.07 |
| 7,224,372 | B2* | 5/2007 | Brown et al. | 345/611 |
| 7,657,098 | B2* | 2/2010 | Lin et al. | 382/199 |
| 7,750,819 | B2* | 7/2010 | Lim | 340/686.1 |
| 7,907,209 | B2* | 3/2011 | Au et al. | 348/448 |
| 8,098,258 | B2* | 1/2012 | Burley et al. | 345/582 |
| 8,121,429 | B2* | 2/2012 | Kondo et al. | 382/254 |

* cited by examiner

*Primary Examiner* — Kanjibhai Patel
(74) *Attorney, Agent, or Firm* — Hogan Lovells US LLP (57) ABSTRACT

A directional anti-aliasing filter circuit includes an input node and an output node, a directional anti-aliasing filter having an input coupled to the input node, an adaptive gain control having an input coupled to an output of the directional anti-aliasing filter, a summer having a first input coupled to an output of the adaptive gain control, a second input coupled to the input node, and an output coupled to the output node, a texture detector for providing a texture adjust signal to the directional anti-aliasing filter and a texture adaptive gain signal to the adaptive gain control, an edge detector for providing an edge direction signal to the directional anti-aliasing filter, and a corner detector for providing a corner adaptive gain signal to the adaptive gain control.

21 Claims, 12 Drawing Sheets

DIRECTIONAL ANTI-ALIASING FILTER

BACKGROUND OF THE INVENTION

The present invention relates generally to the field of video/image processing, and in particular video/images quality improvement by removing aliasing artifacts ("jaggies"). The present invention is targeted to television (TV) and set-top box (STB) products and applications.

Aliasing artifacts are typically created by sampling, upscaling/downscaling, or sharpening. Discontinuity or jaggy artifacts can also be introduced by block-based video/image compression methods. Conventional filtering methods are either ineffective in case of strong artifacts or cause over-blurring of the video/image.

Figure 1:
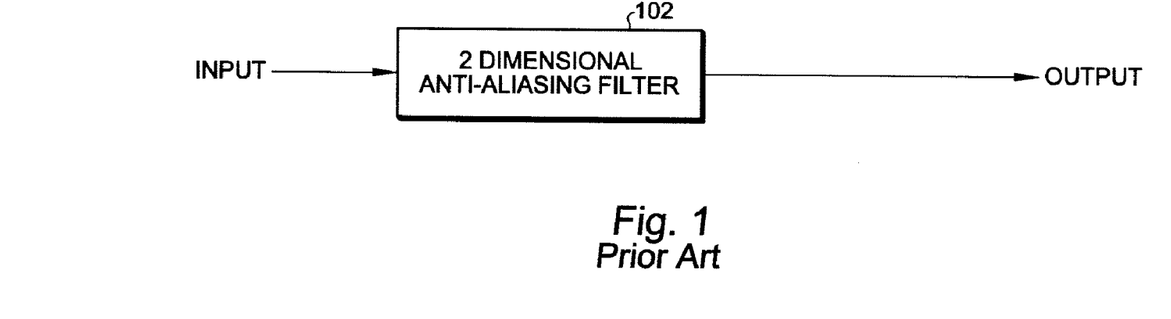
FIG. 1 is a schematic diagram of a prior art anti-aliasing filter circuit.
Figure 2:
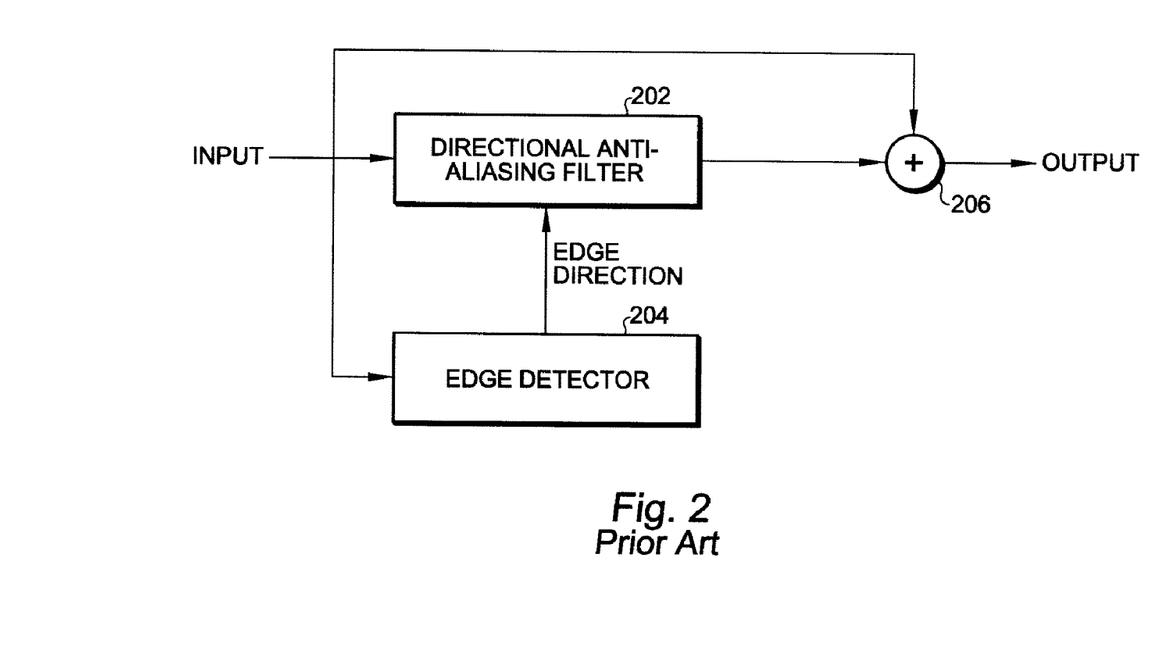
FIG. 2 is a schematic diagram of another prior art anti-aliasing filter circuit.

A first conventional filtering circuit is shown in FIG. 1. A two-dimensional anti-aliasing filter 102 is used to filter the input signal and to provide a filtered output signal. A second conventional filtering circuit is shown in FIG. 2. A directional anti-aliasing filter 202 is used in conjunction with an edge detector 204 and a summer 206. The directional anti-aliasing filter 202 is coupled to the input and to a first input of the summer 206. The second input of the summer 206 is also coupled to the input. The output of the summer 206 is coupled to the output of the filtering circuit. The edge detector 204 provides an edge direction signal to the directional anti-aliasing filter 202.

What is desired, therefore, is an effective filtering circuit that can remove or at least significantly reduce strong artifacts without causing over-blurring of the video/image as in the prior art filtering solutions.

SUMMARY OF THE INVENTION

According to an embodiment of the invention, a directional anti-aliasing filter circuit comprises an input node and an output node, a directional anti-aliasing filter having an input coupled to the input node, an adaptive gain control having an input coupled to an output of the directional anti-aliasing filter, a summer having a first input coupled to an output of the adaptive gain control, a second input coupled to the input node, and an output coupled to the output node, a texture detector for providing a texture adjust signal to the directional anti-aliasing filter and a texture adaptive gain signal to the adaptive gain control, an edge detector for providing an edge direction signal to the directional anti-aliasing filter, and a corner detector for providing a corner adaptive gain signal to the adaptive gain control.

According to a first alternative embodiment of the invention, a directional anti-aliasing filter circuit comprises an input node and an output node, a directional anti-aliasing filter having an input coupled to the input node, an adaptive gain control having an input coupled to an output of the directional anti-aliasing filter, a summer having a first input coupled to an output of the adaptive gain control, a second input coupled to the input node, and an output coupled to the output node, a texture detector for providing a texture adjust signal to the directional anti-aliasing filter and a texture adaptive gain signal to the adaptive gain control, and an edge detector for providing an edge direction signal to the directional anti-aliasing filter.

According to a second alternative embodiment of the invention, a directional anti-aliasing filter circuit comprises an input node and an output node, a directional anti-aliasing filter having an input coupled to the input node, an adaptive gain control having an input coupled to an output of the directional anti-aliasing filter; a summer having a first input coupled to an output of the adaptive gain control, a second input coupled to the input node, and an output coupled to the output node; an edge detector for providing an edge direction signal to the directional anti-aliasing filter; and a corner detector for providing a corner adaptive gain signal to the adaptive gain control.

According to a third alternative embodiment of the invention, a directional anti-aliasing filter circuit comprises an input node and an output node, a directional anti-aliasing filter having an input coupled to the input node and an output coupled to the output node, a texture detector for providing a texture adjust signal to the directional anti-aliasing filter, and a corner detector for providing a corner adjust signal to the directional anti-aliasing filter.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Figure 3:
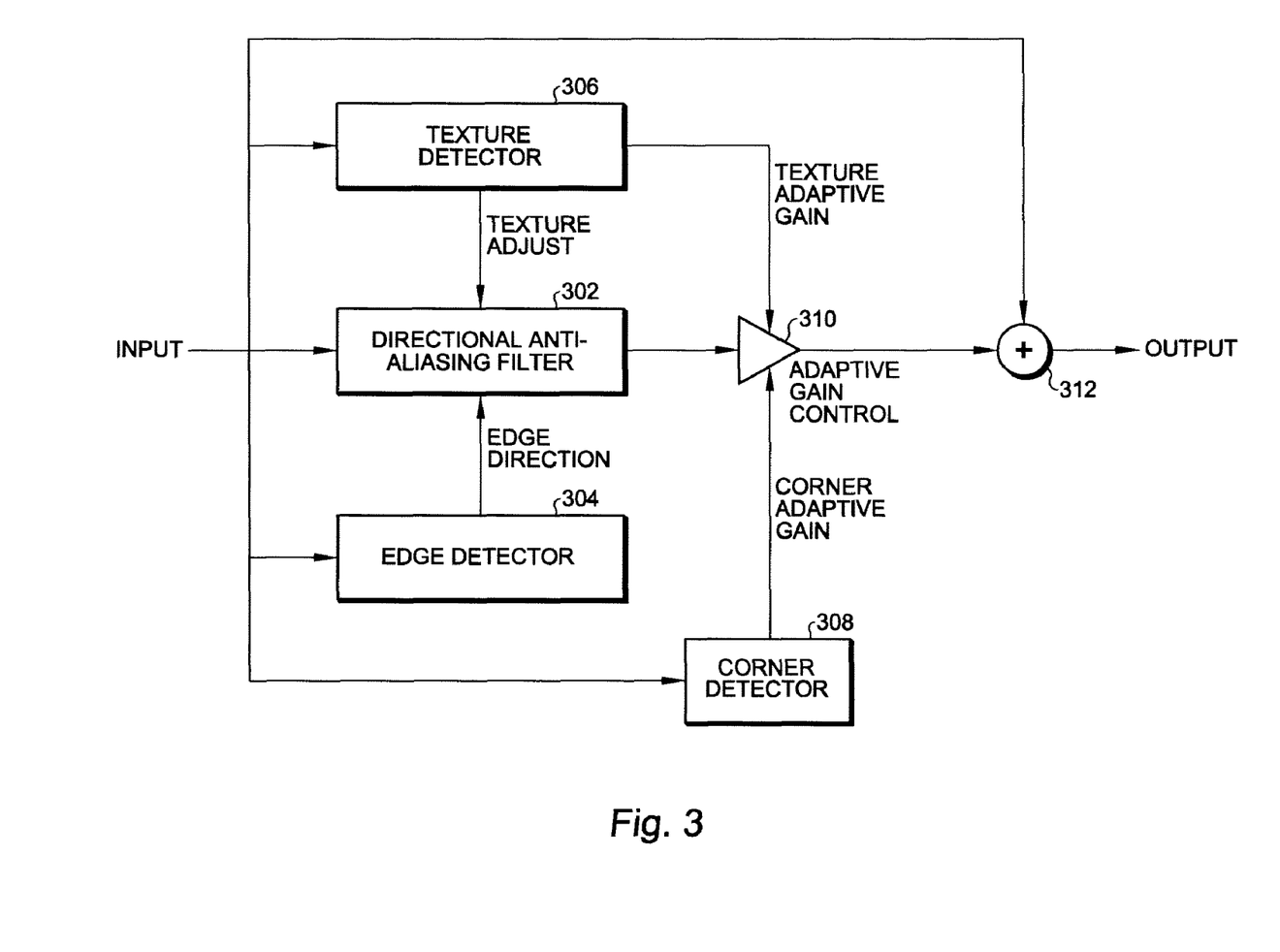
FIG. 3 is a schematic diagram of an anti-aliasing filter circuit according to the present invention.

Referring now to FIG. 3, a directional anti-aliasing filter circuit is shown according to the present invention comprising an input node and an output node, a directional anti-aliasing filter 302 having an input coupled to the input node, an adaptive gain control 310 having an input coupled to an output of the directional anti-aliasing filter 302, a summer 312 having a first input coupled to an output of the adaptive gain control 310, a second input coupled to the input node, and an output coupled to the output node, a texture detector 306 for providing a texture adjust signal to the directional anti-aliasing filter 302 and a texture adaptive gain signal to the adaptive gain control 310, an edge detector 304 for providing an edge direction signal to the directional anti-aliasing filter 302, and a corner detector 308 for providing a corner adaptive gain signal to the adaptive gain control.

Figure 4:
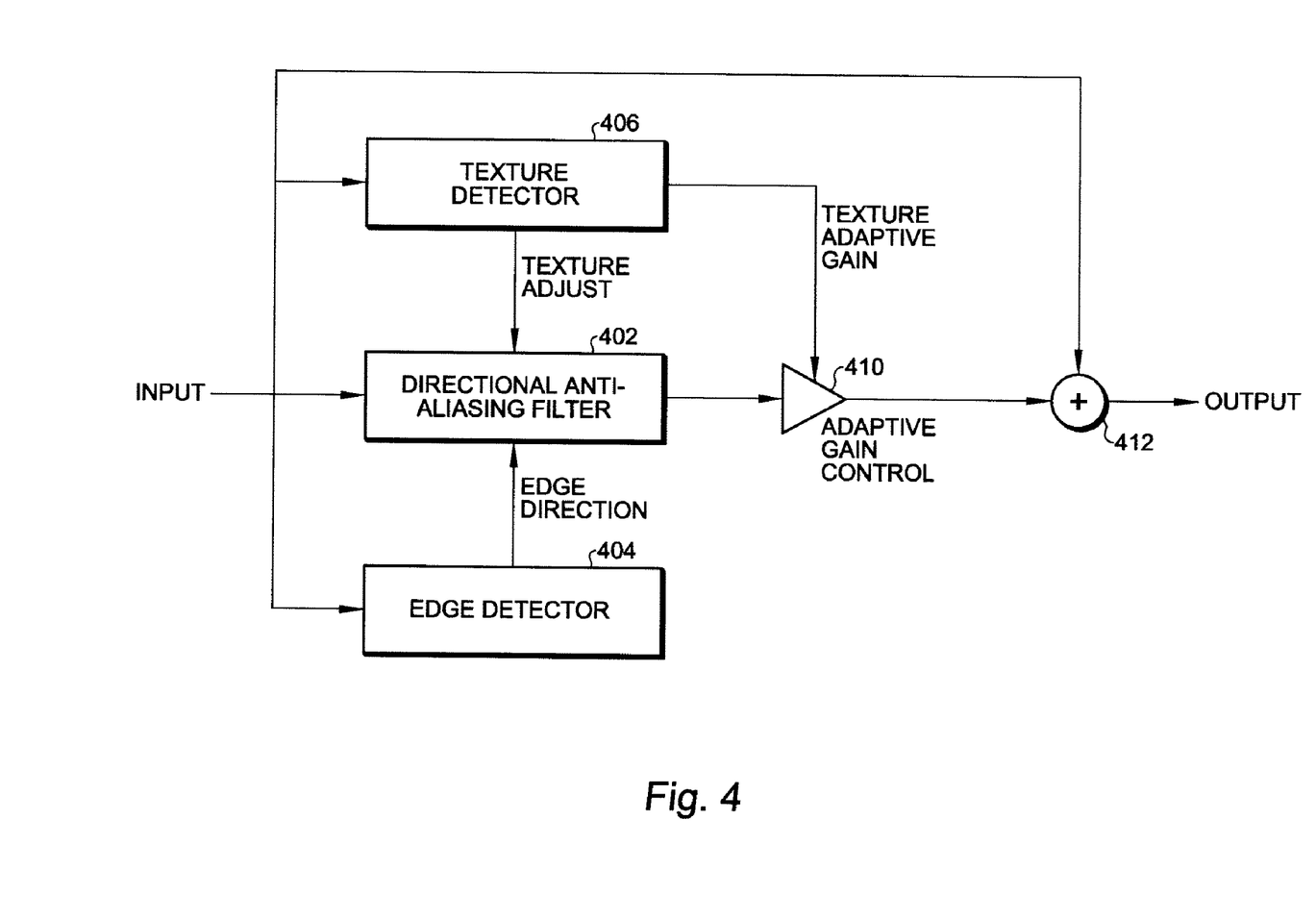
FIG. 4 is a schematic diagram of a first alternative embodiment of the anti-aliasing circuit according to the present invention.

Referring now to FIG. 4, a first alternative embodiment of a directional anti-aliasing filter circuit is shown according to the present invention comprising an input node and an output node, a directional anti-aliasing filter 402 having an input coupled to the input node, an adaptive gain control 410 having an input coupled to an output of the directional anti-aliasing filter 402, a summer 412 having a first input coupled to an output of the adaptive gain control 410, a second input coupled to the input node, and an output coupled to the output node, a texture detector 406 for providing a texture adjust signal to the directional anti-aliasing filter 402 and a texture adaptive gain signal to the adaptive gain control 410, and an edge detector 404 for providing an edge direction signal to the directional anti-aliasing filter 402.

Figure 5:
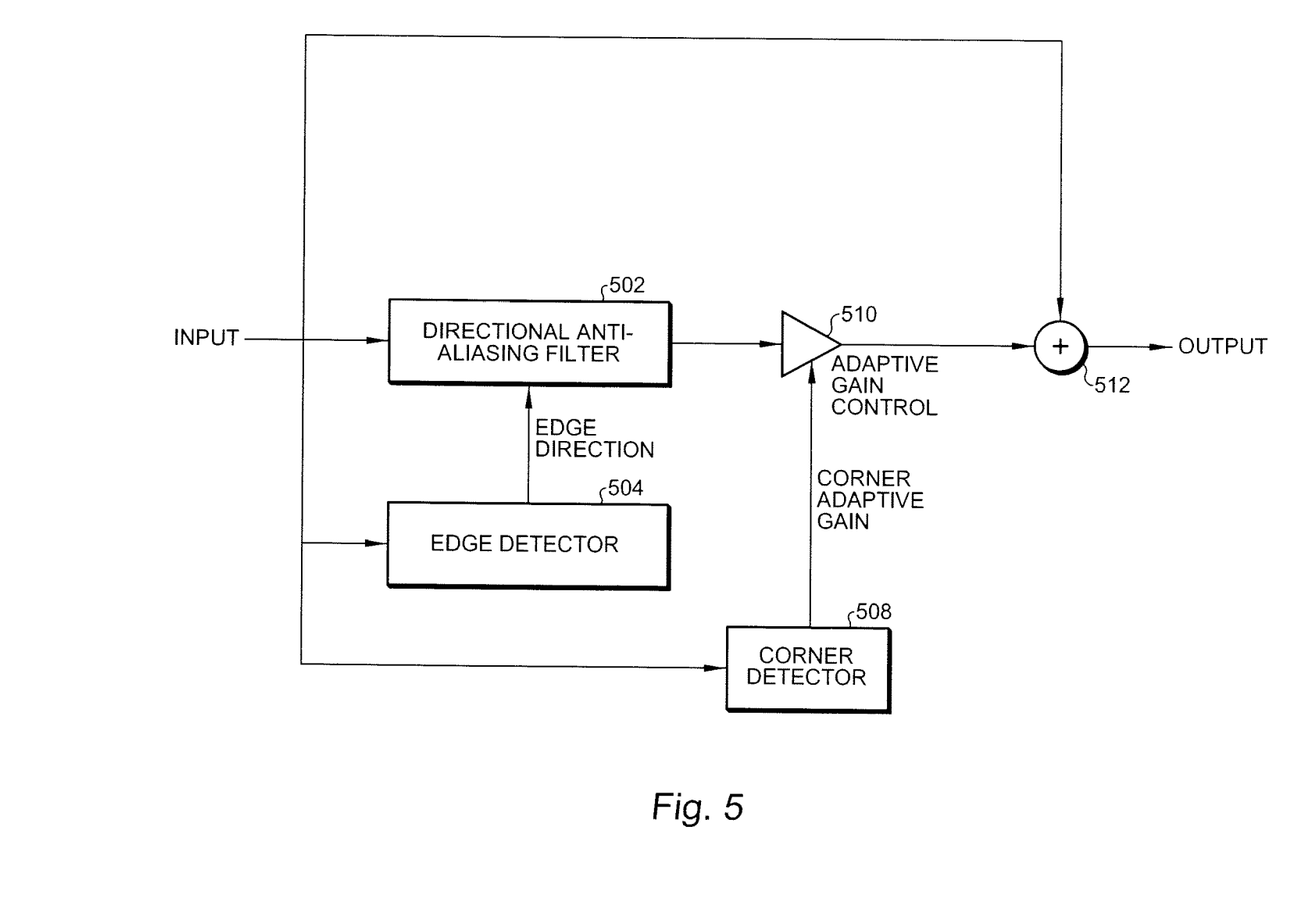
FIG. 5 is a schematic diagram of a second alternative embodiment of the anti-aliasing circuit according to the present invention.

Referring now to FIG. 5, a second alternative embodiment of a directional anti-aliasing filter circuit is shown according to the present invention comprising an input node and an output node, a directional anti-aliasing filter 502 having an input coupled to the input node, an adaptive gain control 510 having an input coupled to an output of the directional anti-aliasing filter 502, a summer 512 having a first input coupled to an output of the adaptive gain control 510, a second input coupled to the input node, and an output coupled to the output node, an edge detector 504 for providing an edge direction signal to the directional anti-aliasing filter 502, and a corner detector 508 for providing a corner adaptive gain signal to the adaptive gain control 510.

Figure 6:
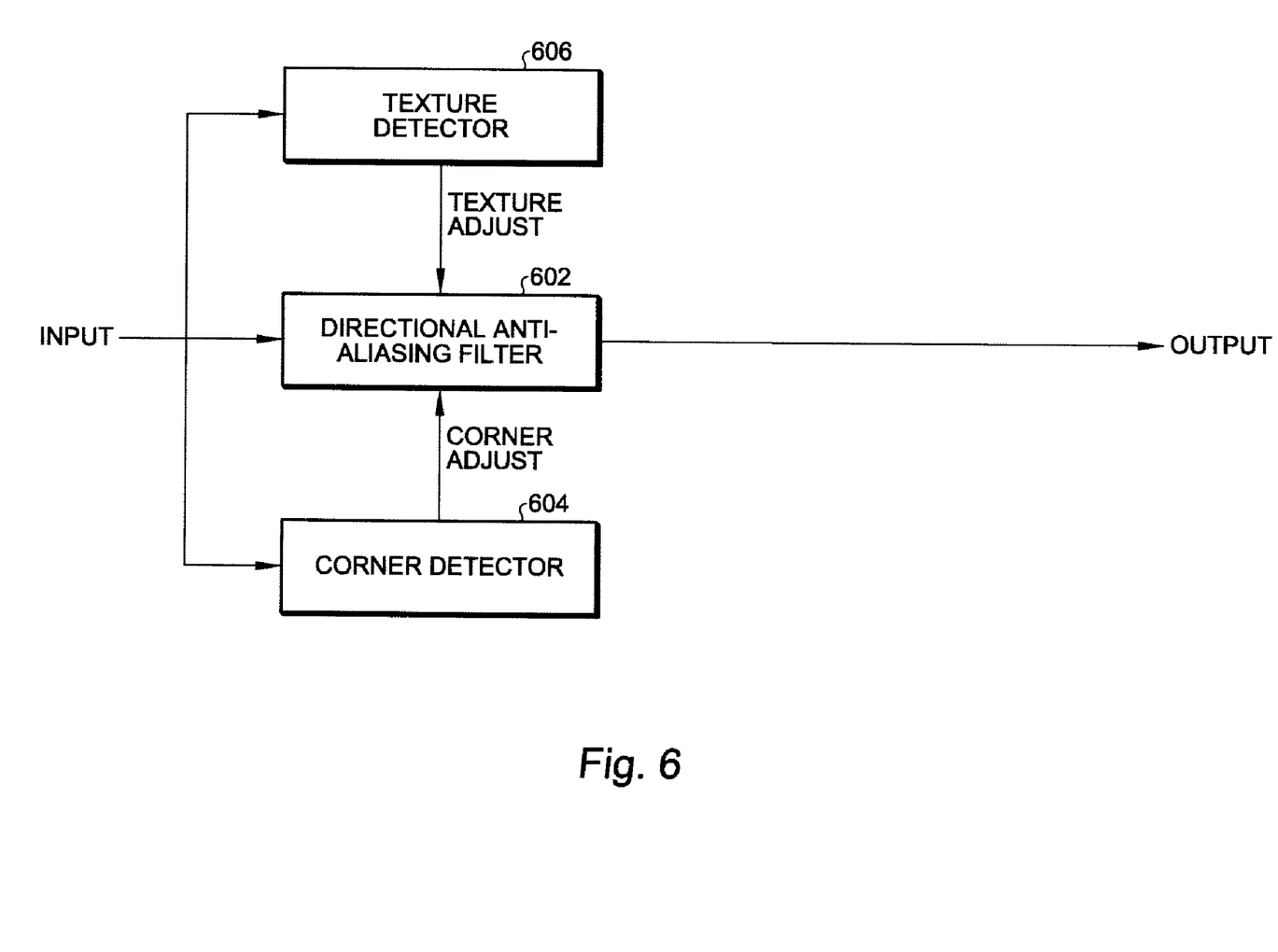
FIG. 6 is a schematic diagram of a third alternative embodiment of the anti-aliasing circuit according to the present invention.

Referring now to FIG. 6, a third alternative embodiment of a directional anti-aliasing filter circuit is shown according to the present invention comprising an input node and an output node, a directional anti-aliasing filter 602 having an input coupled to the input node and an output coupled to the output node, a texture detector 606 for providing a texture adjust signal to the directional anti-aliasing filter 602, and a corner detector 604 for providing a corner adjust signal to the directional anti-aliasing filter 602.

Figure 7:
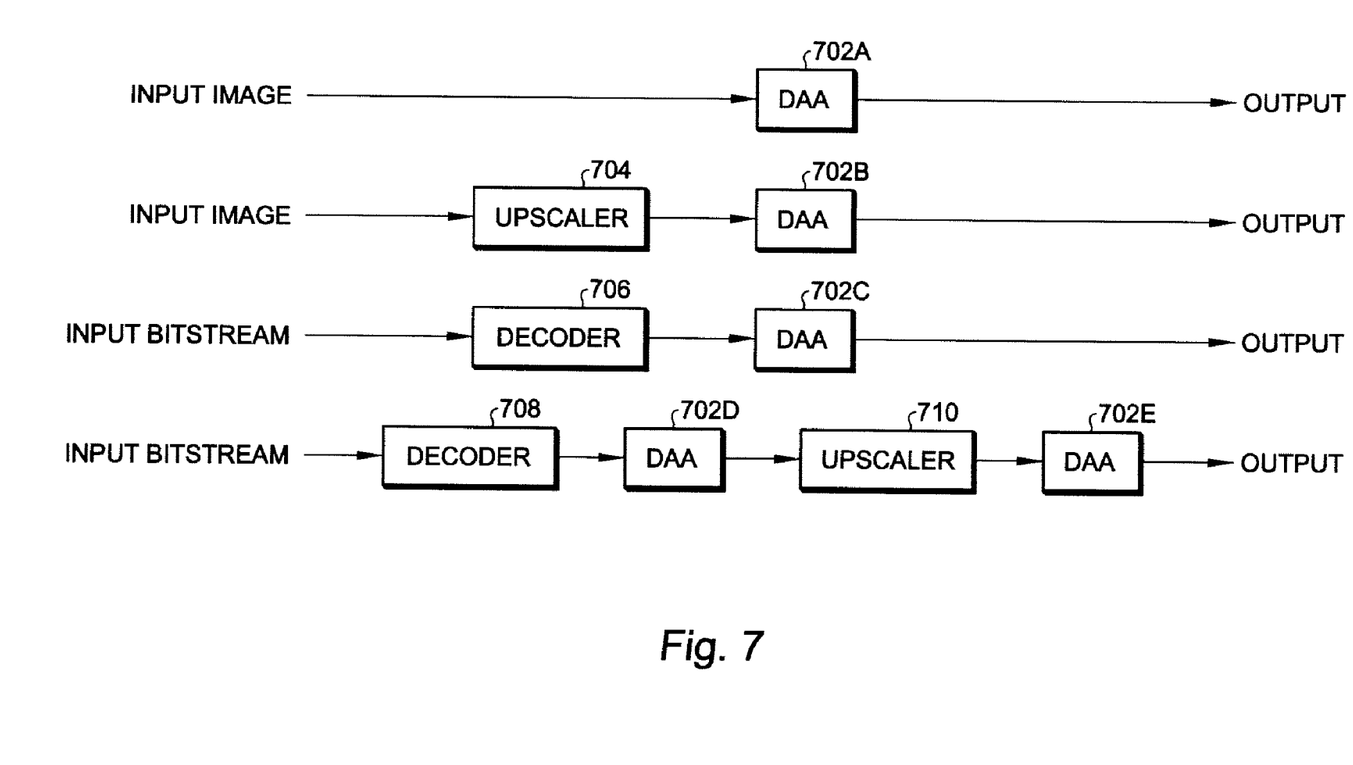
FIG. 7 is an operational overview diagram showing the anti-aliasing circuit of the present invention used in a pre-processing or post-processing environment, or both.

Referring now to FIG. 7, an operational overview diagram is shown of the anti-aliasing circuit of the present invention used in a pre-processing or post-processing environment, or both. The directional anti-aliasing filter circuit of the present invention (DAA) can be applied as a pre-processor and/or post-processor in a video processing pipe-line to improve the image quality. DAA 702A is shown used directly between the input image and the output. DAA 702B is shown for post-processing of an upscaler 704. DAA 702C is shown for post-processing of a decoder 706. DAA 702D is shown for post-processing decoder 708 and pre-processing for upscaler 710. DAA 702E is shown for post-processing for upscaler 710.

Figure 8:
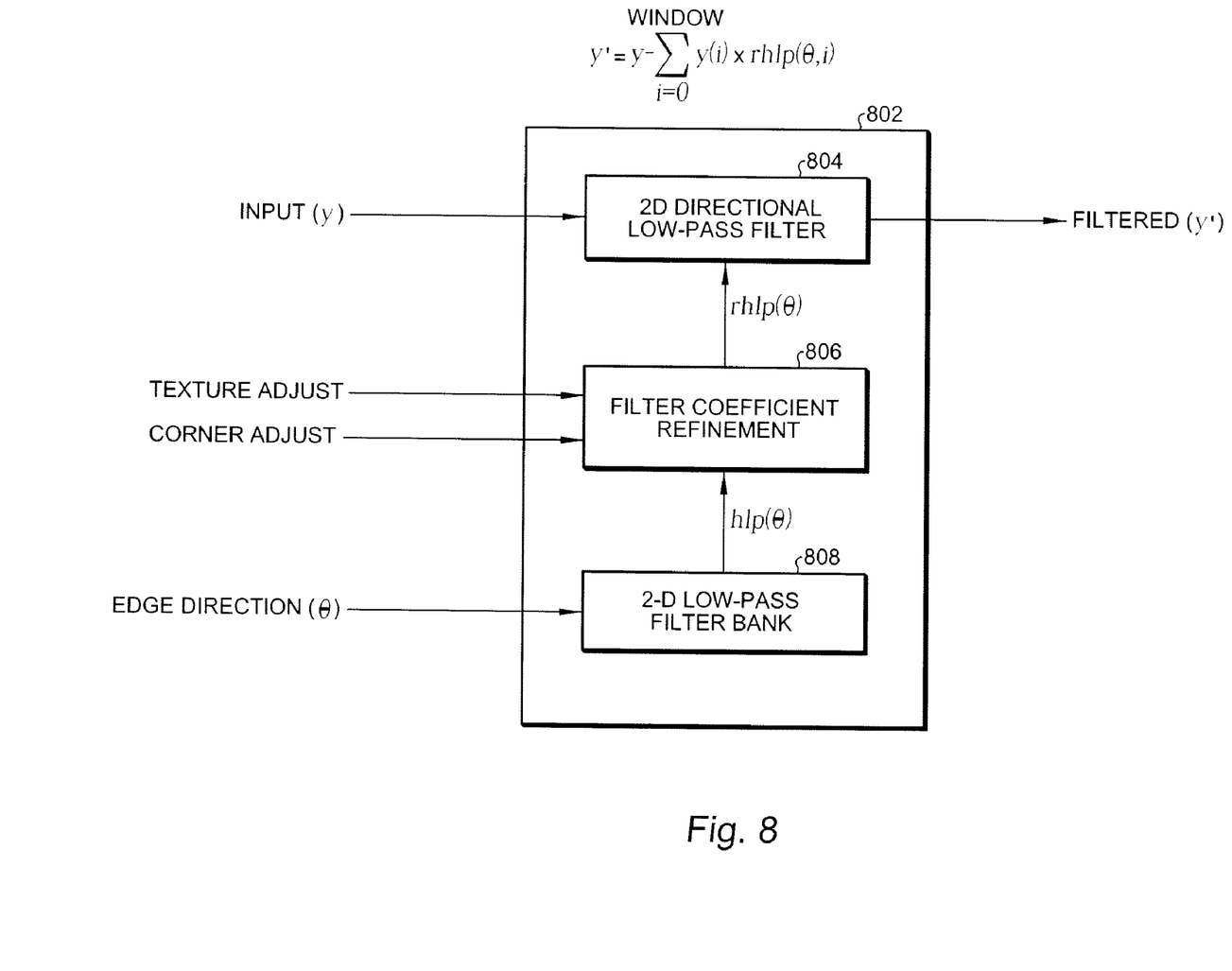
FIG. 8 is a schematic diagram showing further detail of the directional anti-aliasing filter according to the present invention.

Referring now to FIG. 8, a schematic diagram showing further detail of the directional anti-aliasing filter 802 according to the present invention is shown. The directional anti-aliasing filter comprises a first two-dimensional low-pass filter bank 808 for receiving an edge direction signal, a filter coefficient refinement block 806 coupled to the first two-dimensional low-pass filter bank for receiving the texture adjust and corner adjust signals, and a second two-dimensional directional low-pass filter 804 coupled to the filter coefficient refinement block for filtering the input signal and providing a filtered output signal.

Figure 9:
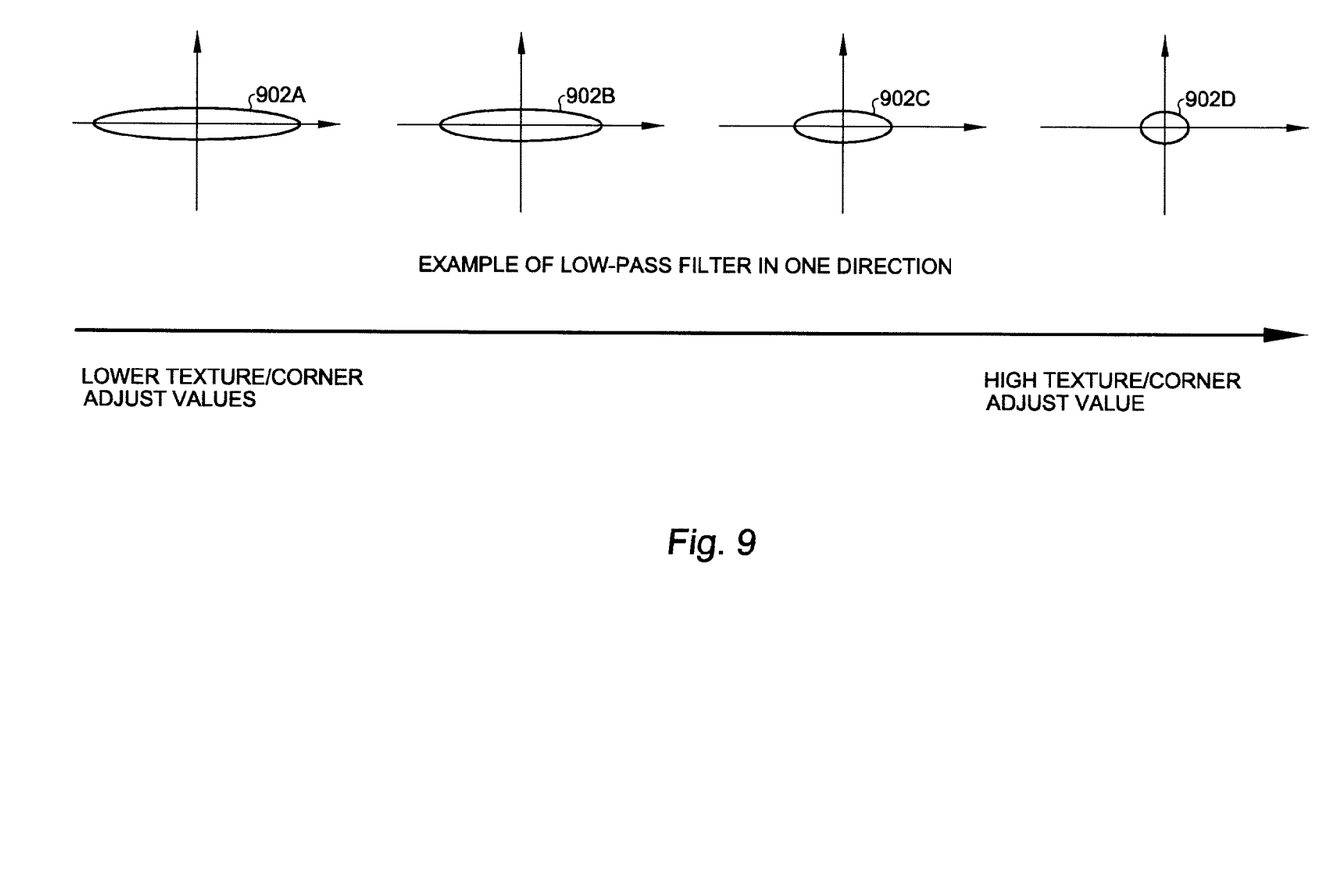
FIG. 9 is a diagram of filter coefficient refinement according to the present invention, showing an example of a low-pass filter output in one direction.

Referring now to FIG. 9, a diagram of filter coefficient refinement according to the present invention shows an example of a low-pass filter output in one direction. Filter contour 902A illustrates the filter coefficients corresponding to lower texture/corner adjust values, whereas filter contour 902D illustrates the filter coefficients corresponding to higher texture/corner adjust values. Contours 902B and 902C illustrate the filter coefficients corresponding to intermediate texture/corner adjust values. The filter coefficients are adjusted based on the texture and corner adjust values of the center pixel. The length of the directional low-pass filter 804 is decreased when texture and corner adjust values are increased.

Figure 10:
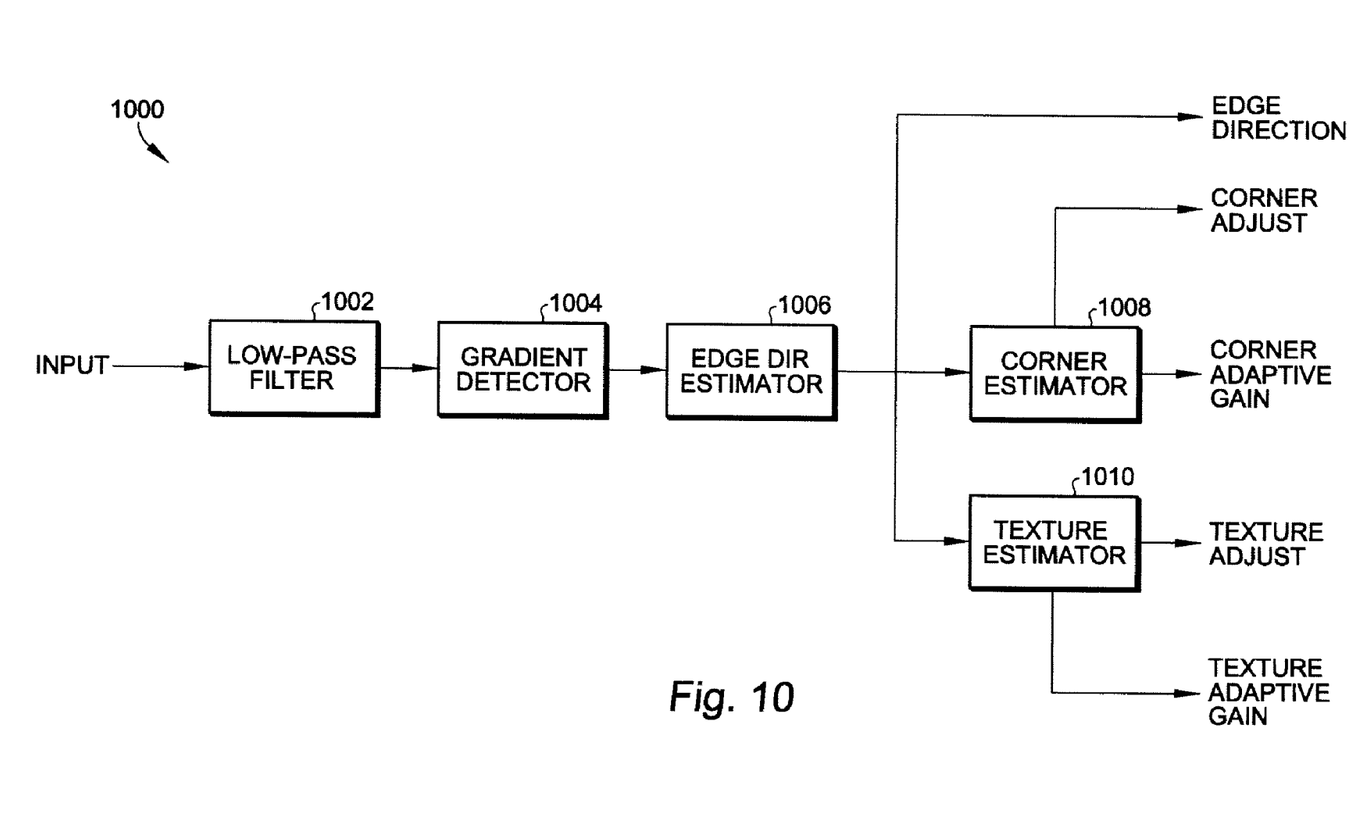
FIG. 10 is a block diagram showing further details of the edge, corner, and texture detectors according to the present invention.

Referring now to FIG. 10, a block diagram shows further details of the edge, corner, and texture detectors according to the present invention. An input signal is received by low-pass filter 1002. A gradient detector 1004 is coupled to the output of low-pass filter 1002. An edge direction estimator 1006 is coupled to the output of gradient detector 1004. The output of the edge direction estimator 1006 provides an edge direction signal. A corner estimator 1008 is coupled to the output of the edge direction estimator 1006 and provides the corner adjust and corner adaptive gain signals. A texture estimator 1010 is coupled to the output of the edge direction estimator 1006 and provides the texture adjust and texture adaptive gain signals.

Figure 17:
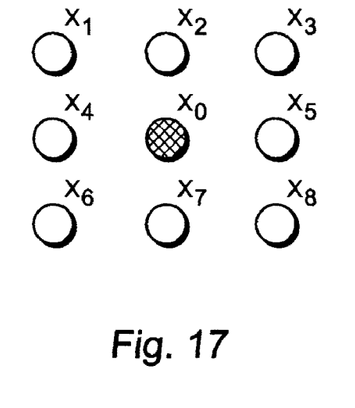
FIG. 17 is a diagram that illustrates the function of the gradient detector according to the present invention.

The low-pass filter 1002 can be a generic 1-D or 2-D noise reduction low-pass filter. The gradient detector 1004 performs gradient estimation along horizontal and vertical directions (see FIG. 17):

$$G_x=((X_1+2\times X_2+X_3)-(X_6+2\times X_7+X_8))/4;$$

$$G_y=((X_1+2\times X_4+X_6)-(X_3+2\times X_5+X_8))/4$$

The function of the edge direction estimator 1006 is given by:

$$\Psi \approx \tan^{-1}(G_x/G_y)$$

Figure 11:
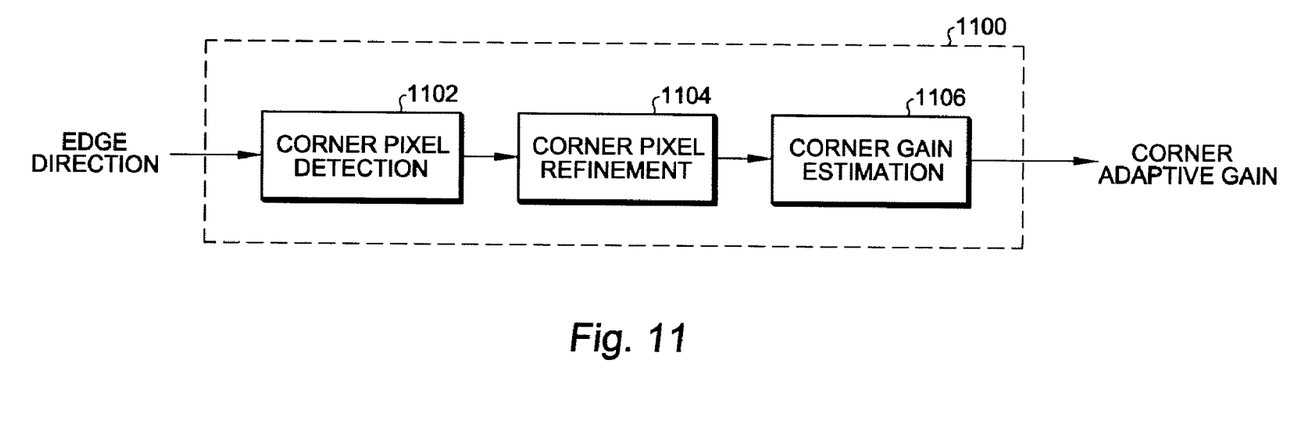
FIG. 11 is a block diagram showing further details of a corner estimator according to the present invention.

Referring now to FIG. 11, further details of the corner estimator 1100 are shown. Corner pixel detection block 1102 receives the edge direction signal. A corner pixel refinement block 1104 is coupled to the output of the corner pixel detection block 1102. A corner gain estimation block 1106 is coupled to the output of the corner pixel refinement block 1104 and provides the corner adaptive gain output signal. FIG. 11 comports to the block diagram representation of FIG. 10. The entire pipeline of the process from Input to Corner Estimator 1008 is the Corner Detector 308, which comports to the block diagram representation of FIG. 3.

Figure 12:
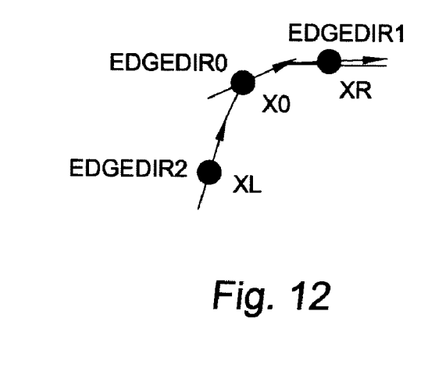
FIG. 12 is a diagram of corner pixel detection according to the present invention.

Corner pixel detection 1102 is further explained below. Corner pixel detection 1102 detects candidates of corner pixels based on the difference of two adjacent local edge directions; adjacent pixels selection is based on the edge direction of current pixel (see FIG. 12).

Figure 13:
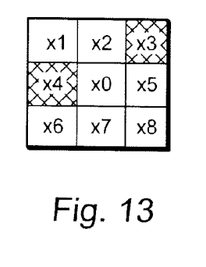
FIG. 13 is a diagram of corner region refinement according to the present invention.

If (|EdgeDir1−EdgeDir2|>Tcorner)/*Tcorner is a threshold*/
    Pcorner(x0)=1; //Pixel X0 is a candidate of corner
Else
    Pcorner(x0)=0; //Pixel X0 is not a candidate of corner Corner region refinement 1104 is further explained below. In a neighborhood window, if two or more pixels are corner candidates, then the central pixel is considered in a corner region (see FIG. 13). For example:

If x3 and x4 are corner pixels, then x0 is considered in corner region, i.e:
Pcorner(x0)=1;
Else
Pcorner(x0)=0;

Corner gain estimation 1106 is further explained below. The corner gain is the sum of the corner pixels in a neighborhood window (N is the number of pixels in the window) given by the following equation:

$$Corner = \frac{1}{N}\sum_{i=0}^{N-1} Pcorner(x_i)$$

Figure 14:
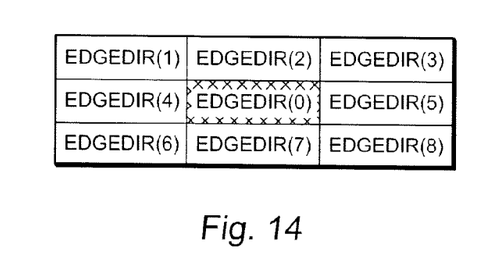
FIG. 14 is a diagram of texture detection according to the present invention.

The texture estimator 1010 is further explained below. Conventionally, texture detection is based on variance of local edge magnitude in a neighborhood window. It is hard to differentiate the texture and edge regions. In the present invention, the texture detection is based on the variance of local edge directions in a neighborhood window. It can detect texture region while differentiating the texture and edge regions. Normally, in the edge region, the variance of local edge directions is lower than that in texture region (see FIG. 14).

$$Texture = \frac{1}{N}\sum_{i=0}^{N-1} (EdgeDir(i) - MeanEDIR)^2$$

Figure 15:
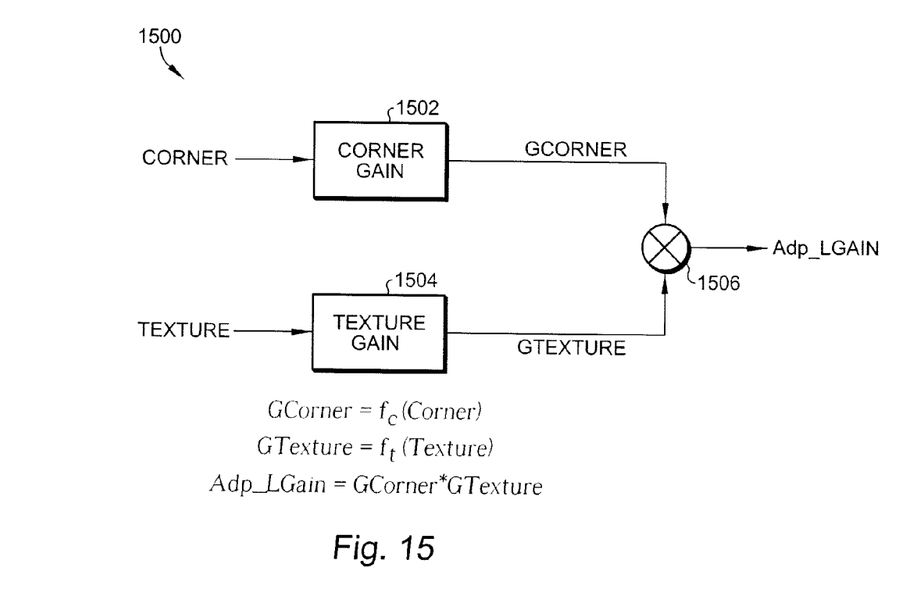
FIG. 15 is a block diagram showing further detail of the adaptive gain control according to the present invention.

The adaptive gain control 1500 is further explained below. Adaptive gain control of the low-pass filter 804 is shown in FIG. 15. The corner signal is amplified by the corner gain block 1502 to provide a GCorner signal, and the texture signal is amplified by the texture gain block 1504 to provide a GTexture signal. The GCorner and GTexture signals are multiplied together in multiplier 1506 to provide the Adp_LGain signal. The Adp_LGain signal is actually inside block 310. The output of block 310 is the low-pass filtered result multiplied by the Adp_Lgain signal.

Figure 16A:
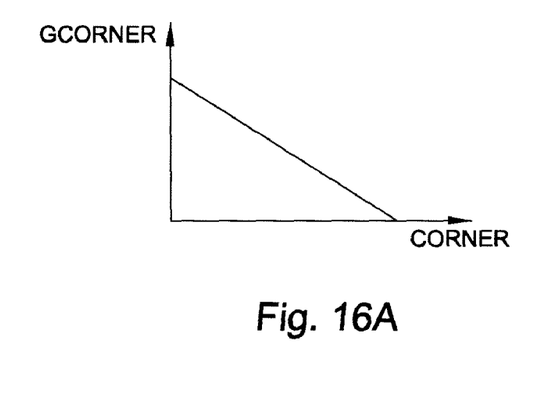
FIGS. 16A, 16B, and 16C are examples of the gain function provided by the adaptive gain control circuit of FIG. 15.
Figure 16B:
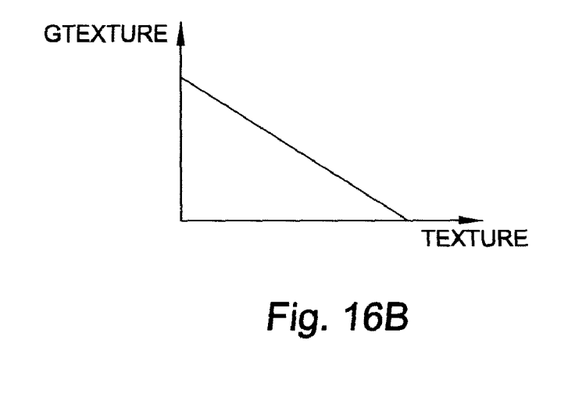
Figure 16C:
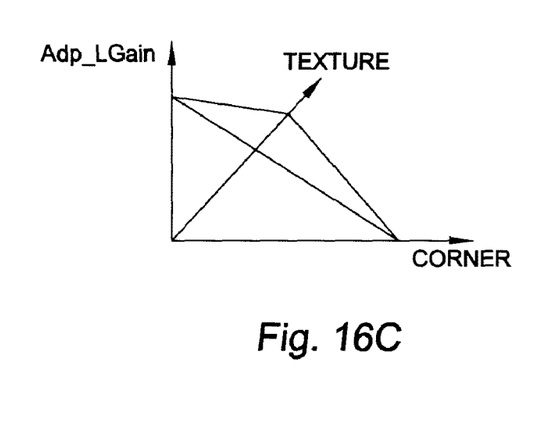

Referring now to FIG. 16, three examples of the Adp_LGain function are shown, wherein FIG. 16A shows the corner gain function, FIG. 16B shows the corner texture function, and FIG. 16C shows the Adp_LGain signal with respect to the corner and texture signals.

According to the present invention, a method of texture detection based on edge gradients, a method of corner detection based on edge gradients, and a method of directional filter coefficient refinement based on local texture and/or local corner information, and a method of directional low-pass or directional anti-aliasing filter based on texture adaptive and/or corner adaptive gain control has been shown.

It will be apparent to those skilled in the art that various modifications and variations can be made in the present invention without departing from the spirit or scope of the invention. As would be apparent to those skilled in the art equivalent embodiments of the present invention can be realized in firmware, software, or hardware, or any possible combination thereof. In addition, although representative block diagrams are shown for an aid in understanding the invention, the exact boundaries of the blocks may be changed and combined or separated out as desired for a particular application or implementation. Thus, it is intended that the present invention cover the modifications and variations of this invention provided they come within the scope of the appended claims and their equivalents.

We claim:

1. A directional anti-aliasing filter circuit comprising:
an input node and an output node;
a directional anti-aliasing filter having an input coupled to the input node;
an adaptive gain control having an input coupled to an output of the directional anti-aliasing filter;
a summer having a first input coupled to an output of the adaptive gain control, a second input coupled to the input node, and an output coupled to the output node;
a texture detector for providing a texture adjust signal to the directional anti-aliasing filter and a texture adaptive gain signal to the adaptive gain control;
an edge detector for providing an edge direction signal to the directional anti-aliasing filter; and
a corner detector for providing a corner adaptive gain signal to the adaptive gain control.

2. The filter circuit of claim 1 comprising a pre-processor in a video processing pipe-line to improve image quality.

3. The filter circuit of claim 1 comprising a post-processor in a video processing pipe-line to improve image quality.

4. The filter circuit of claim 1 wherein the directional anti-aliasing filter comprises:
a first two-dimensional low-pass filter bank;
a filter coefficient refinement block coupled to the first two-dimensional low-pass filter bank; and
a second two-dimensional low-pass filter coupled to the filter coefficient refinement block.

5. The filter circuit of claim 1 wherein the texture detector comprises a texture estimator.

6. The filter circuit of claim 1 wherein the edge detector comprises an edge direction estimator.

7. The filter circuit of claim 1 wherein the corner detector comprises a corner estimator.

8. A directional anti-aliasing filter circuit comprising:
an input node and an output node;
a directional anti-aliasing filter having an input coupled to the input node;
an adaptive gain control having an input coupled to an output of the directional anti-aliasing filter;
a summer having a first input coupled to an output of the adaptive gain control, a second input coupled to the input node, and an output coupled to the output node;
a texture detector for providing a texture adjust signal to the directional anti-aliasing filter and a texture adaptive gain signal to the adaptive gain control; and
an edge detector for providing an edge direction signal to the directional anti-aliasing filter.

9. The filter circuit of claim 8 comprising a pre-processor in a video processing pipe-line to improve image quality.

10. The filter circuit of claim 8 comprising a post-processor in a video processing pipe-line to improve image quality.

11. The filter circuit of claim 8 wherein the directional anti-aliasing filter comprises:
a first two-dimensional low-pass filter bank;
a filter coefficient refinement block coupled to the first two-dimensional low-pass filter bank; and
a second two-dimensional low-pass filter coupled to the filter coefficient refinement block.

12. The filter circuit of claim 8 wherein the texture detector comprises a texture estimator.

13. The filter circuit of claim 8 wherein the edge detector comprises an edge direction estimator.

14. A directional anti-aliasing filter circuit comprising:
an input node and an output node;
a directional anti-aliasing filter having an input coupled to the input node;

an adaptive gain control having an input coupled to an output of the directional anti-aliasing filter;

a summer having a first input coupled to an output of the adaptive gain control, a second input coupled to the input node, and an output coupled to the output node;

an edge detector for providing an edge direction signal to the directional anti-aliasing filter; and a corner detector for providing a corner adaptive gain signal to the adaptive gain control.

15. The filter circuit of claim 14 comprising a pre-processor in a video processing pipe-line to improve image quality.

16. The filter circuit of claim 14 comprising a post-processor in a video processing pipe-line to improve image quality.

17. The filter circuit of claim 14 wherein the directional anti-aliasing filter comprises:

a first two-dimensional low-pass filter bank;

a filter coefficient refinement block coupled to the first two-dimensional low-pass filter bank; and a second two-dimensional low-pass filter coupled to the filter coefficient refinement block.

18. The filter circuit of claim 14 wherein the edge detector comprises an edge direction estimator.

19. The filter circuit of claim 14 wherein the corner detector comprises a corner estimator.

20. A directional anti-aliasing filter circuit comprising:

an input node and an output node;

a directional anti-aliasing filter having an input coupled to the input node and an output coupled to the output node;

a texture detector for providing a texture adjust signal to the directional anti-aliasing filter; and a corner detector for providing a corner adjust signal to the directional anti-aliasing filter.

21. A directional anti-aliasing filtering method comprising:

using a directional anti-aliasing filter to filter a video signal or image;

providing texture information to the directional anti-aliasing filter;

providing edge direction information to the directional anti-aliasing filter; and providing corner adaptive information to the directional anti-aliasing filter.

\* \* \* \* \*